Aug. 21, 1956  R. E. TORREGROSSA ET AL  2,759,679
COMBINED BEARING AND GUIDE MEANS FOR SHAFTS
Filed Sept. 22, 1952  2 Sheets-Sheet 1

Robert E. Torregrossa INVENTORS
Roy D. Babington

BY
Attorneys

Aug. 21, 1956 R. E. TORREGROSSA ET AL 2,759,679
COMBINED BEARING AND GUIDE MEANS FOR SHAFTS
Filed Sept. 22, 1952 2 Sheets-Sheet 2

Robert E. Torregrossa
Roy D. Babington
INVENTORS

BY *signatures*
Attorneys

2,759,679

COMBINED BEARING AND GUIDE MEANS FOR SHAFTS

Robert E. Torregrossa and Roy D. Babington, Bogalusa, La.

Application September 22, 1952, Serial No. 310,808

1 Claim. (Cl. 242—68)

This invention relates to new and useful improvements in shaft holding and supporting apparatus and the primary object of the present invention is to provide means for supporting horizontally disposed vertically movable shafts of rewinding shaft mechanisms.

Another important object of the present invention is to provide a combined bearing and guide means for shafts consisting of a pair of coacting vertically slidable members each of which is provided with a horizontally slidable bearing carrying a stub shaft that will enter a socket in a shaft.

A further object of the present invention is to provide a combined bearing and guide means of the aforementioned character wherein the bearings are simultaneously actuated by fluid pressure whereby a shaft may be quickly and readily applied to or removed from the bearings in a convenient manner to reduce to a minimum the time required for installing and removing sectional shafts of rewinding apparatus.

A still further aim of the present invention is to provide a combined bearing and guide means for shafts that is extremely simple and practical in construction, strong and reliable in use, efficient and durable in operation, inexpensive to manufacture and maintain, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 1:
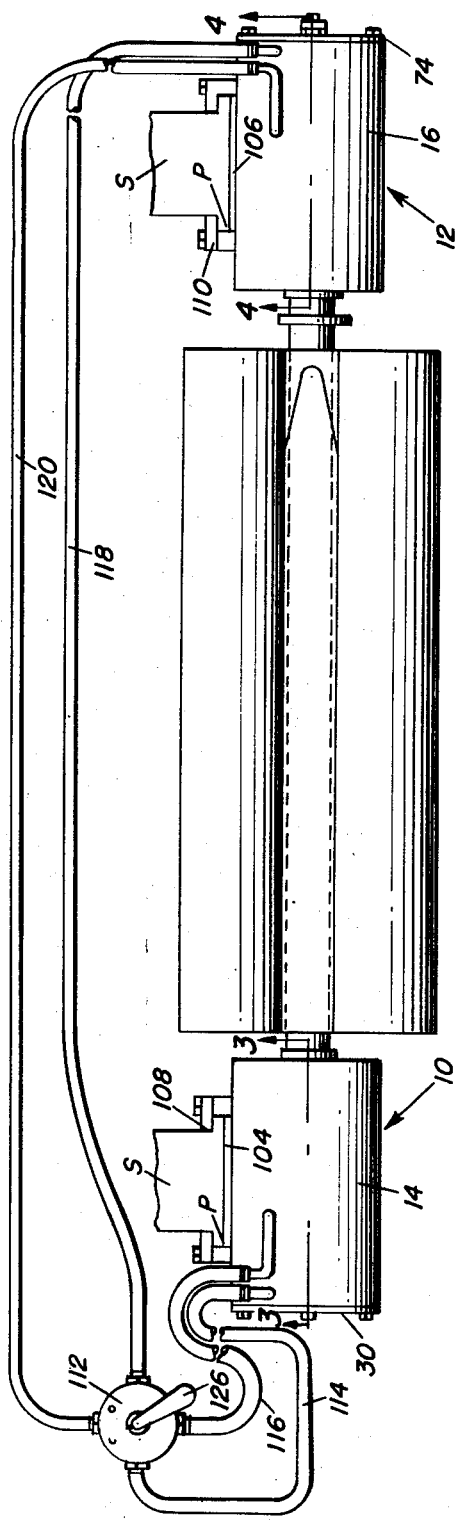
Figure 1 is a top plan view of the present invention in use.
Figure 2:
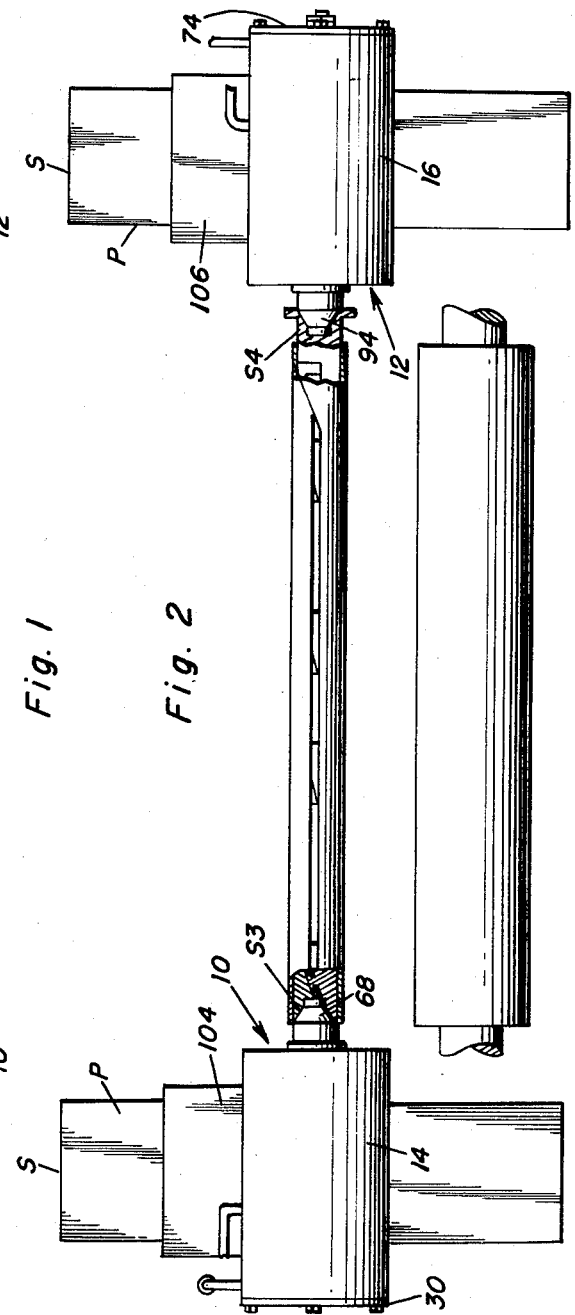
Figure 2 is a fragmentary front elevational view of Figure 1.
Figure 3:
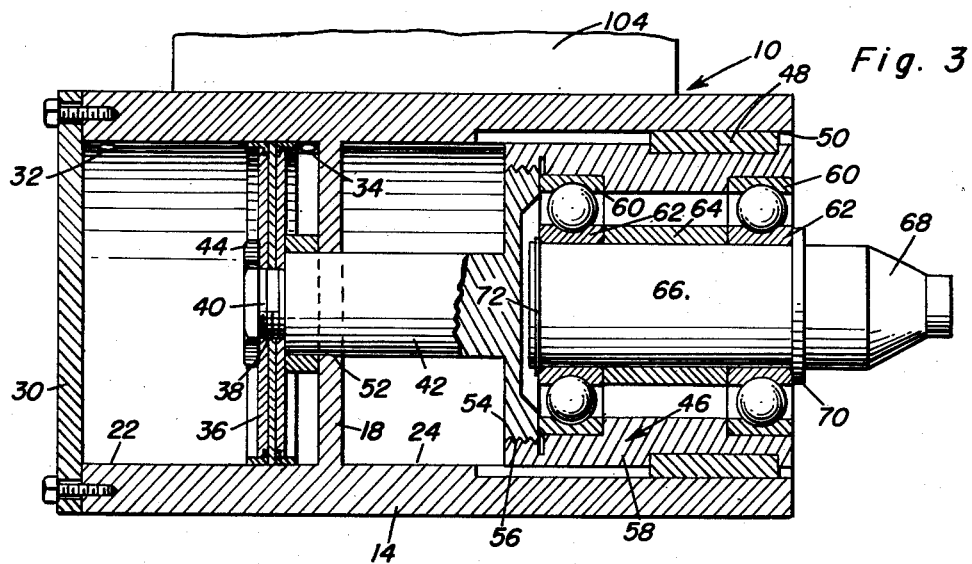
Figure 3 is an enlarged vertical sectional view taken substantially on the plane of section line 3—3 of Figure 1.
Figure 4:
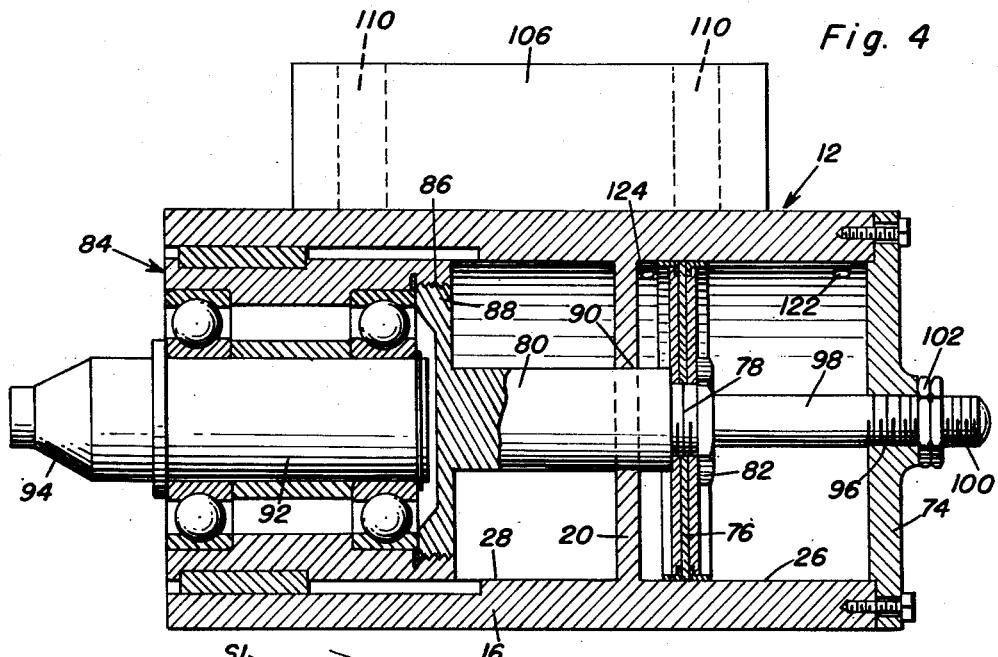
Figure 4 is an enlarged vertical sectional view taken substantially on the plane of section line 4—4 of Figure 1; and, Figure 5 is a fragmentary perspective view of one end of a sectional shaft that is to be supported by the present invention.
Figure 5:
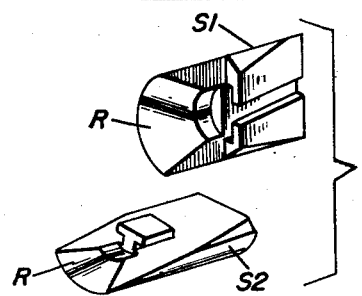

Referring now to the drawings in detail wherein for the purpose of illustration, there is disclosed a preferred embodiment of the present invention, the numerals 10 and 12 represent a pair of coacting bearing and guiding members generally. The members 10 and 12 include cylinders 14 and 16 having partitions 18 and 20 that divide the cylinders 14 and 16 into end compartments of chambers 22, 24 and 26, 28 respectively.

The outer end chamber 22 of cylinder 14 is provided with a removable end wall 30 and a pair of ports 32 and 34. A piston 36 is slidably received in the end chamber 22 and is provided with a central aperture 38 that receives the reduced threaded end 40 of a piston rod 42. A nut 44 is threaded on end 40 and clampingly secures the piston 36 to rod 42.

A bearing unit 46 is slidably received in chamber 24 and supports a key 48 that enters a longitudinal keyway 50 formed in the inner periphery of chamber 24. Rod 42 extends through an aperture 52 in partition 18 and terminates in an externally threaded flange 54 that is threaded in a socket 56 in bearing unit 46.

The outer sleeve 58 of unit 46 is formed with internal grooves that accommodate the outer rings 60 of ball bearing races. The inner rings 62 of the ball bearing races are connected by an inner sleeve 64 that coacts with rings 62 in receiving a stub shaft 66 having an outer tapered end 68. A shoulder 70 on the outer periphery of the shaft 66 engages the ring 62 of the outermost ball bearing race and a removable split ring 72 in a peripheral groove in shaft 66 engages the inner ring 62 of the other ball bearing race to hold shaft 66 to the ball bearing races.

The outer chamber 26 of cylinder 16 is provided with a removable end wall 74 to confine a piston 76 within chamber 26. The reduced externally threaded end 78 of a piston rod 80 extends through a central aperture in piston 76 and receivably engages a nut 82 that secures the piston and rod together. A bearing unit 84 is slidably received in chamber 28 and is provided with a threaded recess 86 that receivably engages the threaded flange 88 of rod 80. Rod 80 is slidably positioned through an aperture 90 in partition 20.

Bearing unit 84 is similar in construction to bearing unit 46 and removably and rotatably supports a sub shaft 92 having a tapered outer end 94.

End wall 74 is formed with a reinforced central aperture 96 that slidably receives a stop rod 98 having its inner end suitably fixedly attached to or integrally formed with rod 80. The outer externally threaded end 100 of stop rod 98 receivably engages stop nuts 102 that will engage wall 74 to limit sliding movement of the piston 76 in one direction.

Vertical channels 104 and 106 are fixed by welding or the like to the cylinders 14 and 16 and the flanges of these channels removably support retaining strips 108 and 110 that inwardly overhang these flanges to engage behind the vertical flanged portions P of vertical supports S.

A valve 112 is suitably located with respect to members 10 and 12. Valve 112 is provided with flexible tubes 114 and 116 that are coupled to ports 32 and 34, and flexible tubes 118 and 120 that are connected to ports 122 and 124 of chamber 26. Valve 112 is operatively connected to a source of air under pressure so that as the valve handle 126 is swung in one direction, air under pressure will enter cylinders 22 and 26 by way of ports 32 and 122 to move the pistons 36 and 76 toward each other. As the handle 126 is swung in an opposite direction, air under pressure will enter chambers 22 and 26 by way of ports 32 and 124 to move cylinders 36 and 76 away from each other.

The members 10 and 12 are intended to support a sectional shaft Sh of the type referred to in our U. S. Patent No. 2,594,095, issued April 22, 1952. The sections S1 and S2 of shaft Sh are formed with concave recesses R at their ends that together form sockets S3 and S4 for the ends 68 and 94 of stub shafts 66 and 92.

As material is wound on shaft Sh from a horizontal reel (not shown) supported adjacent frame uprights S (as disclosed in our above referred to patent), the members 10 and 12 will slide upwardly until a predetermined amount of material has been wound on shaft Sh. Then, valve handle 126 is moved to retract the stub shafts 66 and 92, to permit removal of shaft Sh from members 10 and 12. Power driven drum rolls Ro are supported by the frame under the shaft Sh and act as supports for the shaft Sh and its rewound material and also provide the driving means for rotating the rewind shaft.

Having described the invention, what is claimed as new is:

A combined bearing and guide block comprising a horizontally disposed cylinder having a vertical partition therein dividing the cylinder into a pair of axially aligned cylindrical chambers, a cylindrical bearing housing slidably and non-rotatably mounted in one of said chambers, a stub shaft journaled in said bearing housing and extending outwardly therefrom, the inner end of said bearing housing being interiorly threaded, a piston rod having an enlarged end threadedly engaged within said housing inner end, said partition having an axial opening formed in the central portion thereof, said piston rod including an intermediate portion extending from said enlarged end through said partition opening into said other chamber and an opposite end portion of a diameter smaller than the diameter of said intermediate portion so as to form a vertical shoulder on said piston rod, a piston mounted on said piston rod end portion in engagement with said shoulder for sliding movement within said other chamber, a first nut threadedly mounted on said piston rod end portion in engagement with said piston so as to secure the latter on said piston rod in engagement with said shoulder, a cylinder head closing said other chamber and having a central axial opening therein, the free end of said piston rod end portion being reduced in diameter and extending through said cylinder head opening, said other chamber having ports adjacent the ends thereof, means for applying fluid through said ports for axially moving said piston and hence said stub shaft, and a second nut threaded on the free end of said piston rod outwardly of said cylinder head for engaging the latter so as to adjustably limit the outward movement of said stub shaft.

References Cited in the file of this patent

UNITED STATES PATENTS

| | | |
|---|---|---|
| 1,491,200 | Cline | Apr. 22, 1924 |
| 1,577,579 | Hirschler | Mar. 23, 1926 |
| 1,908,121 | Crafts | May 9, 1933 |
| 2,075,192 | George | Mar. 30, 1937 |
| 2,373,226 | Coates | Feb. 18, 1942 |
| 2,391,265 | Palmer | Dec. 18, 1945 |
| 2,501,985 | Benjamin | Mar. 28, 1950 |
| 2,524,106 | Hanson | Oct. 3, 1950 |

FOREIGN PATENTS

| | | |
|---|---|---|
| 626,649 | France | Mar. 16, 1927 |
| 512,019 | Germany | Nov. 8, 1930 |